(12) United States Patent
Yamamoto (10) Patent No.: US 12,307,146 B2
(45) Date of Patent: May 20, 2025

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventor: Norio Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 458 days.

(21) Appl. No.: 17/547,235

(22) Filed: Dec. 10, 2021

(65) Prior Publication Data

US 2023/0029037 A1  Jan. 26, 2023

(30) Foreign Application Priority Data

Jul. 14, 2021  (JP) .................................. 2021-116489

(51) Int. Cl.
G06F 3/12 (2006.01)

(52) U.S. Cl.
CPC .......... *G06F 3/1273* (2013.01); *G06F 3/1204* (2013.01); *G06F 3/1238* (2013.01)

(58) Field of Classification Search
CPC ..... G06F 3/1273; G06F 3/1204; G06F 3/1238
USPC .................................................. 358/1.1–1.8
See application file for complete search history.

(56) References Cited

U.S. PATENT DOCUMENTS

| | | | |
|---|---|---|---|
| 7,613,404 B2 | 11/2009 | Takeuchi et al. | |
| 2005/0174601 A1* | 8/2005 | Sawada | G03G 15/507 358/1.15 |
| 2012/0069395 A1 | 3/2012 | Hiraike | |
| 2013/0016375 A1* | 1/2013 | Hashidume | G06F 3/1222 358/1.9 |
| 2014/0085659 A1 | 3/2014 | Jeong | |
| 2019/0146738 A1 | 5/2019 | Masui | |
| 2020/0159640 A1 | 5/2020 | Sato | |
| 2021/0136252 A1* | 5/2021 | Fukuda | H04N 1/32106 |

FOREIGN PATENT DOCUMENTS

| | | |
|---|---|---|
| JP | 2006107217 | 4/2006 |
| JP | 2007174258 | 7/2007 |
| JP | 2012068725 | 4/2012 |
| JP | 2019091242 | 6/2019 |
| JP | 2020086696 | 6/2020 |
| JP | 2021096590 | 6/2021 |

OTHER PUBLICATIONS

"Office Action of Japan Counterpart Application", issued on Jan. 21, 2025, with English translation thereof, p. 1-p. 9.

* cited by examiner

*Primary Examiner* — Gabriel I Garcia
(74) *Attorney, Agent, or Firm* — JCIPRNET (57) ABSTRACT

An image forming apparatus include a processor configured to: obtain a type of use, a tendency of use, or a use condition of the image forming apparatus by a user; and transmit a log regarding use of the image forming apparatus by the user with the obtained type of use, the obtained tendency of use, or the obtained use condition being distinguishable.

14 Claims, 7 Drawing Sheets

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 USC 119 from Japanese Patent Application No. 2021-116489 filed Jul. 14, 2021.

BACKGROUND

(i) Technical Field

The present disclosure relates to an image forming apparatus, a non-transitory computer readable medium, and an image forming method.

(ii) Related Art

Japanese Unexamined Patent Application Publication No. 2006-107217 discloses an image forming apparatus that performs processing relating to formation of images. The image forming apparatus includes log management means for managing generated log information and log transfer means for transferring a piece of the log information, which is managed by the log management means, set in log transfer information to a destination set in the log transfer information.

Japanese Unexamined Patent Application Publication No. 2020-086696 discloses a network client including plural collection means for collecting logs of detected event information and setting means for managing a first table indicating a correspondence between a type of collection and at least one of the plural collection means. The plural collection means each manage a second table indicating a correspondence between a type of collection and a type of event. If an event collection request that specifies a type of collection and an obtaining trigger is received from an external system, the setting means refers to the first table and identifies one or more collection means corresponding to the type of collection included in the event collection request and instructs the one or more identified collection means to collect event information on the basis of the type of collection and the obtaining trigger. The collection means each refer to the second table, performs a validation process for collecting, in accordance with the obtaining trigger included in the instruction, event information of a type of event corresponding to the type of collection included in the instruction from the setting means, and notifies the setting means of a result of the validation process. The setting means transmits, to the external system, a result of reflection of a type of collection for which the validation process has been successfully completed. After the validation process is performed, a log regarding the event information collected by the collection means is transmitted over a network.

SUMMARY

There is a technique for transmitting logs to a server and detecting abnormalities at the server. This technique, however, does not take into consideration whether the logs have changed in accordance with changes in how an apparatus is used. In other words, because types of use, tendencies of use, or use conditions are not distinguished from one another, an abnormality might be detected, for example, in a log that is normal under a certain use condition.

Aspects of non-limiting embodiments of the present disclosure relate to an image forming apparatus, a non-transitory computer readable medium, and an image forming method capable of detecting abnormalities in logs more accurately than when logs are transmitted without distinguishing types of use, tendencies of use, or use conditions by a user of the image forming apparatus with one another.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a processor configured to: obtain a type of use, a tendency of use, or a use condition of the image forming apparatus by a user; and transmit a log regarding use of the image forming apparatus by the user with the obtained type of use, the obtained tendency of use, or the obtained use condition being distinguishable.

BRIEF DESCRIPTION OF THE DRAWINGS

Exemplary embodiments of the present disclosure will be described in detail based on the following figures, wherein.

DETAILED DESCRIPTION

Exemplary Embodiments will be described hereinafter with reference to the drawings. The same components or the same steps are given the same reference numerals throughout the drawings, and redundant description is omitted.

First Exemplary Embodiment

Figure 1:
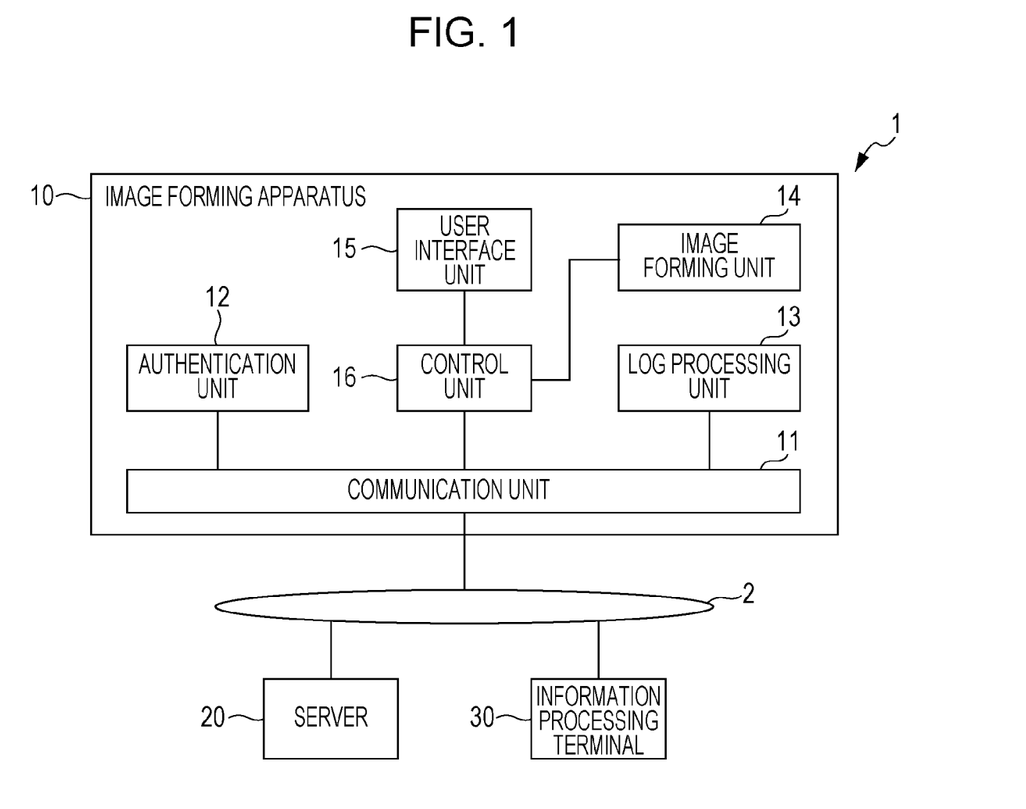
FIG. 1 is a diagram illustrating an example of the configuration of an image forming system according to a first exemplary embodiment and a second exemplary embodiment.

FIG. 1 is a diagram illustrating an example of the configuration of an image forming system 1 that prints a specified image on a recording medium.

As illustrated in FIG. 1, the image forming system 1 includes an image forming apparatus 10, a server 20, and an information processing terminal 30, which are connected to one another over a communication network 2.

The image forming apparatus 10 has an image forming function, which is used to print, on a recording medium such as sheets of paper, images indicated by print data received from the information processing terminal 30 over the communication network 2 or images obtained by scanning documents. The image forming apparatus 10 may be an apparatus having plural functions, such as a fax machine or a scanner, insofar as the image forming apparatus 10 has the image forming function. It is assumed in the following description that the image forming apparatus 10 is an apparatus having only the image forming function.

The server 20 analyzes logs transmitted from the image forming apparatus 10 over the communication network 2 and detects abnormalities.

The information processing terminal 30 is an information device having a function of transmitting print data stored in a storage device to the image forming apparatus 10 over the communication network 2, such as a smartphone, a tablet computer, or a laptop computer.

Although the example of the image forming system 1 illustrated in FIG. 1 includes only one image forming apparatus 10, one server 20, and one information processing terminal 30, the image forming system 1 may include any number of image forming apparatuses 10, servers 20, and information processing terminals 30.

The image forming apparatus 10 transmits logs, and the server 20 performs risk analyses and risk detection. The image forming apparatus 10 has various functions, which are used like devices of different types. In order for the server 20 to perform risk analyses and risk detection accurately, logs regarding different types of use received from the image forming apparatus 10 need to be handled separately.

Destinations of logs are automatically determined by identifying types of use of the image forming apparatus 10 on the basis of setting information regarding the image forming apparatus 10. As a result, even with devices of the same type, risk analyses and risk detection can be performed more accurately by determining destinations of logs in accordance with types of use.

In view of information security, the image forming apparatus 10 rejects print requests from unspecified users. An authentication process, therefore, is performed such that only registered users can use all functions of the image forming apparatus 10 and other users can use only a limited number of functions.

The image forming apparatus 10, which transmits logs and performs the authentication process, includes function units such as a communication unit 11, an authentication unit 12, a log processing unit 13, an image forming unit 14, a user interface unit 15, and a control unit 16.

The communication unit 11 receives print instructions including print data from the information processing terminal 30 over the communication network 2 and transmits, to the server 20, a log regarding various events including printing to be performed by the image forming apparatus 10. The log regarding various events is an example of a log regarding use of the image forming apparatus by the user.

The authentication unit 12 compares identification information received by the user interface unit 15 and registered identification information regarding users in order to authenticate whether a user who is requesting printing is a registered user. More specifically, if the identification information registered in the image forming apparatus 10 includes identification information that matches the identification information received by the user interface unit 15, the authentication unit 12 determines that the user who is requesting printing is a registered user.

The identification information used in the authentication performed by the authentication unit 12 may be any kind of information insofar as a user who is requesting printing can be uniquely identified, such as user identifiers (IDs).

The authentication unit 12 may or may not perform authentication depending on settings of the image forming apparatus 10.

The log processing unit 13 transmits a log regarding events to a predetermined destination using the communication unit 11 in accordance with a type of use of the image forming apparatus 10 by the user.

Figure 4:
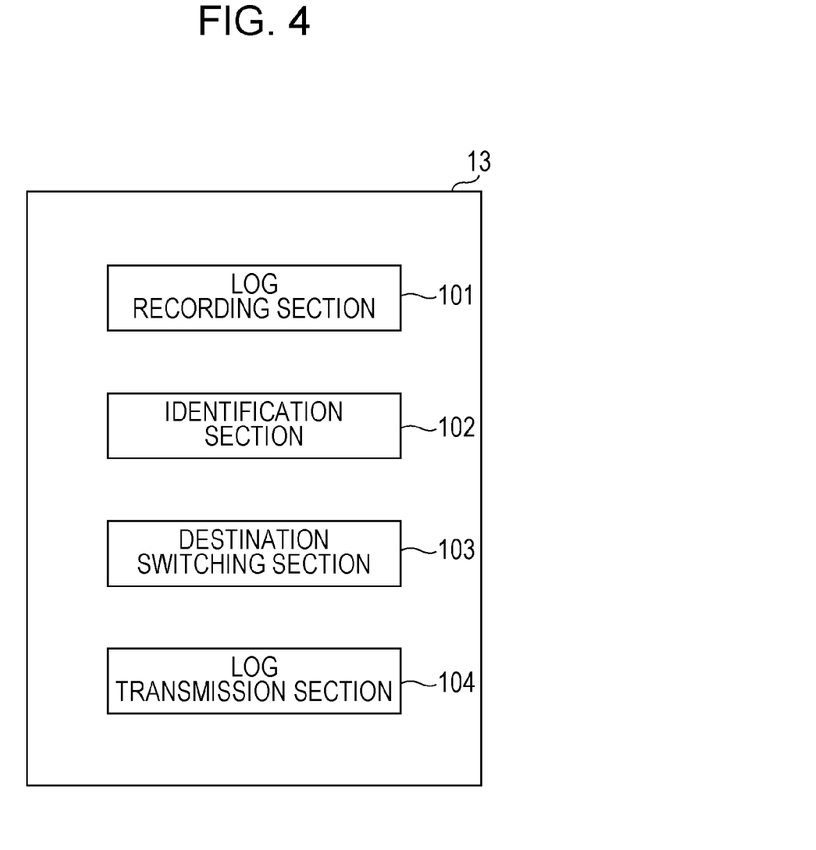
FIG. 4 is a diagram illustrating an example of the configuration of a log processing unit of the image forming apparatus according to the first and second exemplary embodiments.

More specifically, as illustrated in FIG. 4, the log processing unit 13 includes a log recording section 101, an identification section 102, a destination switching section 103, and a log transmission section 104.

The log recording section 101 sequentially records events caused in the image forming apparatus 10 in a log saving area of a nonvolatile memory 44 as a log. Events include, for example, "user account XX successfully authenticated" and "printing based on user request from account YY".

The identification section 102 identifies a type of use from setting information regarding the image forming apparatus 10. The type of use to be identified is a predetermined category suitable for appropriately and accurately performing a risk analysis and risk detection on a log collected by the server 20. More specifically, examples of the type of use to be identified include "with authentication", which indicates a case where the authentication unit 12 authenticates a user, and "without authentication", which indicates that the authentication unit 12 does not authenticate a user.

When settings relating to user authentication are changed, the identification section 102 determines whether the type of use is "with authentication" or "without authentication".

The destination switching section 103 switches a destination of a log to a predetermined destination in accordance with the identified type of use.

More specifically, as indicated in the following table, a log destination table stores a log destination for each type of use. A log destination is a combination of an Internet protocol (IP) address and a port number of a destination server.

The destination switching section 103 notifies the log transmission section 104 of an identified type of use and a log destination determined from the log destination table to switch the log destination.

TABLE 1

| Type of use | Log destination |
| --- | --- |
| With authentication | 111.222.12.34:50010 |
| Without authentication | 111.222.12.34:50020 |

This table indicates an example where a destination for image forming apparatuses 10 that do not perform authentication and a destination for image forming apparatuses 10 that perform authentication are prepared as log destinations for risk analyses and risk detection. In this example, the two destinations have the same IP address and different port numbers.

Because the log destination (an address and a port of the server 20) might be changed even for the same type of use after the operation of the image forming apparatus 10 starts, means for updating the log destination table from the outside may be provided. Furthermore, means for updating the identification section 102 from the outside may be provided in order to adjust to changes (an increase or a decrease in number, completely different types of use, etc.) to types of use.

The log transmission section 104 transmits a log saved in the log saving area of the nonvolatile memory 44 to a specified log destination using the communication unit 11.

The image forming unit 14 prints, on a recording medium, images indicated by print data received from the information processing terminal 30 and images obtained by scanning documents. The image forming unit 14 may use any image forming method, and a known image forming method, such as xerography or an inkjet method, for example, is used.

The user interface unit 15 receives identification information regarding a user who operates the image forming apparatus 10 and instructions from the user and transmits the identification information and the instructions to the control unit 16. The user interface unit 15 also outputs, to the user in accordance with instructions from the control unit 16, various pieces of information regarding printing performed by the image forming apparatus 10.

The control unit 16 controls the communication unit 11, the authentication unit 12, the log processing unit 13, the image forming unit 14, and the user interface unit 15 such that the communication unit 11, the authentication unit 12, the log processing unit 13, the image forming unit 14, and the user interface unit 15 perform the above-described processes.

Figure 2:
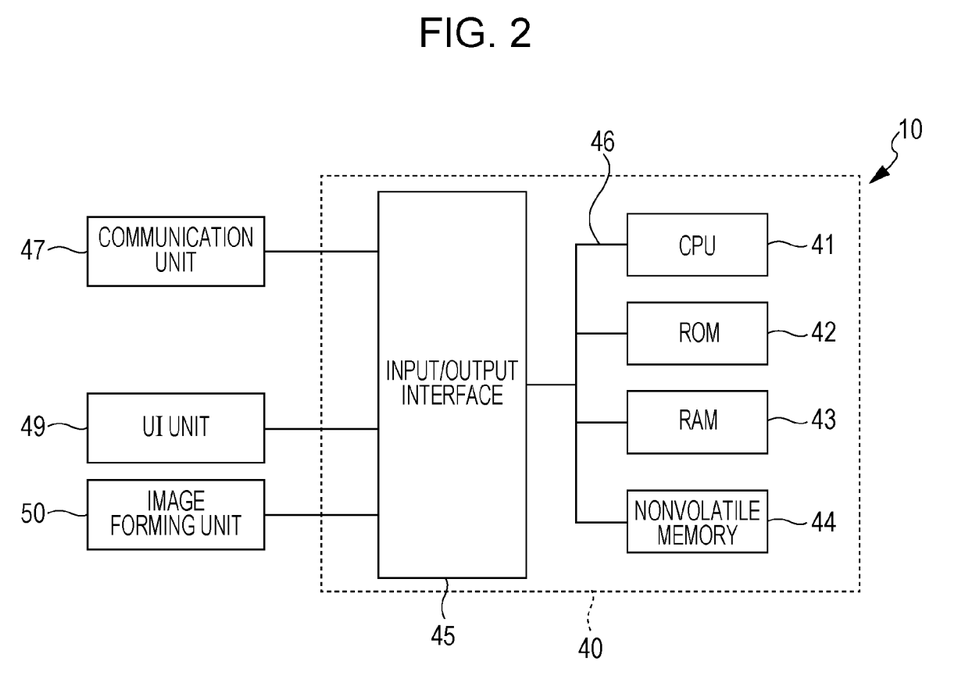
FIG. 2 is a diagram illustrating an example where a computer achieves the image forming apparatus according to the first and second exemplary embodiments.

The image forming apparatus 10 illustrated in FIG. 1 is achieved by a computer 40. FIG. 2 is a diagram illustrating an example where the computer 40 achieves the image forming apparatus 10.

The computer 40 includes a central processing unit (CPU) 41, which is an example of a processor that executes functions of the image forming apparatus 10, a read-only memory (ROM) 42 storing a program for forming an image, which causes the computer 40 to function as the image forming apparatus 10, a random-access memory (RAM) 43 used as a temporary working area of the CPU 41, a nonvolatile memory 44, and an input/output interface 45. The CPU 41, the ROM 42, the RAM 43, the nonvolatile memory 44, and the input/output interface 45 are connected to one another through a bus 46.

The nonvolatile memory 44 is an example of a storage device that keeps holding stored information even when power is not supplied thereto. The nonvolatile memory 44 is a semiconductor memory, for example, but may be a hard disk, instead. The nonvolatile memory 44 stores, for example, identification information regarding the registered users.

A communication unit 47, a user interface (UI) unit 49, and an image forming unit 50, for example, are connected to the input/output interface 45.

The communication unit 47 has a communication protocol for communicating data with the server 20 and the information processing terminal 30 through wired or wireless communication.

The UI unit 49 provides an interface between the image forming apparatus 10 and a user who operates the image forming apparatus 10. The UI unit 49 receives identification information regarding the user who operates the image forming apparatus 10 and instructions from the user and transmits the identification information and the instructions to the CPU 41, and also outputs information processed by the CPU 41 to the outside. The UI unit 49 is achieved by buttons, a touch panel, and a liquid crystal display, for example, and the touch panel is mounted on the liquid crystal display. Information processed by the CPU 41 is displayed on the liquid crystal display, and a process associated with an object, such as a button, displayed on the liquid crystal display at a position selected through the touch panel is performed.

A display device such as an organic electroluminescent (EL) display may be used for the UI unit 49 instead of the liquid crystal display.

The image forming unit 50 forms images on a recording medium in accordance with instructions from the CPU 41.

Figure 3:
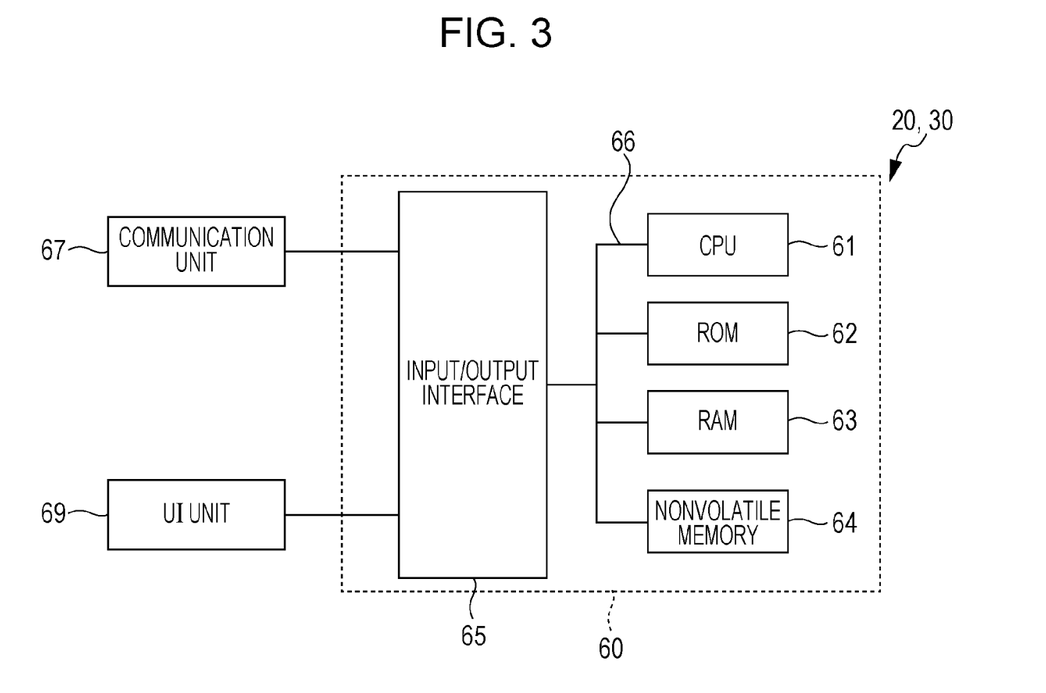
FIG. 3 is a diagram illustrating an example of a configuration where another computer achieves a server and an information processing terminal according to the first and second exemplary embodiments.

The server 20 and the information processing terminal 30 illustrated in FIG. 1, on the other hand, are both achieved by a computer 60. FIG. 3 is a diagram illustrating an example of a configuration where the computer 60 achieves the server 20 and the information processing terminal 30.

The computer 60 includes a CPU 61, which is an example of a processor that executes functions of the server 20 and the information processing terminal 30, a ROM 62 storing a program for causing the computer 60 to function as the server 20 and the information processing terminal 30, a RAM 63, which is used as a temporary working area of the CPU 61, a nonvolatile memory 64, and an input/output interface 65. The CPU 61, the ROM 62, the RAM 63, the nonvolatile memory 64, and the input/output interface 65 are connected to one another through a bus 66.

The nonvolatile memory 64 stores, for example, print data to be used by the image forming apparatus 10 for printing.

A communication unit 67 and a UI unit 69, for example, are connected to the input/output interface 65.

The communication unit 67 has a communication protocol for communicating data with the image forming apparatus 10 through wired or wireless communication.

The UI unit 69 provides an interface for a user who operates the server 20 and the information processing terminal 30. The UI unit 69 receives instructions from the user who operates the server 20 and the information processing terminal 30 and transmits the instructions to the CPU 61, and also outputs information processed by the CPU 61 to the outside. As with the UI unit 49 of the image forming apparatus 10, the UI unit 69 is achieved by buttons, a touch panel, and a liquid crystal display, for example, and the touch panel is mounted on the liquid crystal display. It is needless to say that a display device such as an organic EL display may be used instead of the liquid crystal display.

Next, log processing performed by the image forming apparatus 10 will be described in detail.

The program for forming an image, which specifies the log processing, is stored, for example, in the ROM 42 of the image forming apparatus 10 in advance. The CPU 41 of the image forming apparatus 10 reads the program for forming an image stored in the ROM 42 and performs the log processing.

First, the log recording section 101 of the image forming apparatus 10 sequentially records, in the log saving area of the nonvolatile memory 44, events caused in the image forming apparatus 10 as a log.

The identification section 102 then identifies, when settings relating to user authentication are changed, whether the type of use is "with authentication" or "without authentication".

It is assumed, for example, that the type of use is "without authentication" immediately after the image forming apparatus 10 is installed, and the identification section 102 notifies the destination switching section 103 that the type of use is "without authentication".

When the identified type of use is "without authentication", the destination switching section 103 switches the log destination to "111.222.12.34:50010", which corresponds to "without authentication". The log transmission section 104 then transmits, using the communication unit 11, the log saved in the log saving area of the nonvolatile memory 44 to the destination of the server 20 for processing a log "without authentication". Unless the settings relating to the authentication process are changed, the log destination does not change, and the log transmission section 104 transmits logs to the same destination.

If the type of use in the settings of the image forming apparatus 10 is changed from "without authentication" to "with authentication", the identification section 102 detects the change and notifies the destination switching section 103 of the change.

The destination switching section 103 then notifies the log transmission section 104 of the identified type of use "with authentication" and the log destination "111.222.12.34:50020" in the log destination table in order to change the log destination. The log transmission section 104 transmits the log saved in the log saving area of the nonvolatile memory 44 to the new log destination using the communication unit 11.

The log processing has been described.

The server 20 then performs a risk analysis and risk detection on the log transmitted to the destination for processing a log "without authentication".

More specifically, the server 20 performs a risk analysis and risk detection on a log transmitted to a destination for processing a log "with authentication". It is assumed here that unregistered users can use a limited number of functions as guest users even in the case of "with authentication". If the server 20 detects a sudden increase in use by guest users in a log transmitted to the destination for processing log "with authentication", the server 20 determines that there is a risk.

For example, the server 20 collects a frequency of use by authenticated users and a frequency of use by guest users in unit time, for example, and if a rate of change in each of the frequencies exceeds a threshold, determines that there is a risk.

In the case of "without authentication", users operate image forming apparatuses 10 as guest users. The server 20, therefore, does not determine that there is a risk, even if the server 20 detects a sudden increase in the frequency of use by guest users in a log transmitted to the destination for processing a log "without authentication".

It is assumed, for example, that there are one thousand image forming apparatuses 10 and only one hundred of the image forming apparatuses 10 are operated "without authentication". If frequencies of use of these one hundred image forming apparatuses 10 increase, it seems as a whole that frequencies of use by guest users have increased, and a risk might be undesirably detected as a sign of some kind of unauthorized use. Since the server 20 performs a risk analysis and risk detection using a log transmitted to a destination for processing a log "without authentication" in the present exemplary embodiment, the server 20 does not detect a risk even under the above condition. Incorrect detection of risks is thus reduced.

Different types of risk analysis and risk detection are thus performed by separating log destinations for "without authentication" and "with authentication".

As described above, according to the first exemplary embodiment, abnormalities in logs are detected more accurately than when logs are transmitted without distinguishing types of use by users of image forming apparatuses from one another. In addition, even if settings relating to use of image forming apparatuses are changed, accuracy of a risk analysis and risk detection does not decrease.

Second Exemplary Embodiment

Next, an image forming system according to a second exemplary embodiment will be described. The configuration of the image forming system according to the second exemplary embodiment is the same as that according to the first exemplary embodiment, and description thereof is omitted while giving the same reference numerals.

The second exemplary embodiment is different from the first exemplary embodiment in that a destination of a log is switched in accordance with a tendency of use by the user.

The log processing unit 13 of the image forming apparatus 10 according to the second exemplary embodiment transmits, using the communication unit 11, a log regarding events to a predetermined destination in accordance with a tendency of use of the image forming apparatus 10 by the user.

The identification section 102 of the log processing unit 13 identifies a tendency of use from a use history of the image forming apparatus 10. The identified tendency of use is a predetermined category suitable for appropriately and accurately performing risk analyses and risk detection of logs collected by the server 20. More specifically, the identified tendency of use may be, for example, "copying", which indicates that a function of printing images obtained by scanning documents has been frequently used, "printing", which indicates that a function of printing images indicated by received print data has been frequently used, or "copying and printing", which indicates both the function of printing images obtained by scanning documents and the function of printing images indicated by received print data have been frequently used.

The identification section 102 identifies, when the number of times of printing reaches a certain value, whether the tendency of use is "copying", "printing", or "copying and printing".

The image forming apparatus 10 stores the use history thereof. As indicated by the following table, examples of the use history include the number of times of copying, which is the number of times that the function of printing images obtained by scanning documents has been used, and the number of times of printing, which is the number of times that the function of printing images indicated by received print data has been used.

TABLE 2

| Function | Number of times |
|---|---|
| Copying | 0 |
| Printing | 0 |

This table indicates an example where the number of times of copying is 0 and the number of times of printing is 0 in the use history immediately after the image forming apparatus 10 is installed.

Each time printing is performed, the number of times of copying or the number of times of printing increases in the use history and is saved.

Each time a total number of times for triggering, which is counted for triggering a process for identifying the tendency of use, reaches a threshold (e.g., 1,000), for example, the identification section 102 identifies the tendency of use.

If the number of times of copying is 90% or more of a total number of times, the identification section 102 determines that the tendency of use is "copying". If the number of times of printing is 90% or more of the total number of times, the identification section 102 determines that the tendency of use is "printing". The total number of times used here is a sum of the number of times of copying and the number of times of printing in the use history and different from the total number of times for triggering, which is reset each time the tendency of use is identified.

If the tendency of use has been previously identified as "copying" and the number of times of copying becomes 80% or less of the total number of times, the identification section 102 determines that the tendency of use is "copying and printing".

If the tendency of use has been previously identified as "printing" and the number of times of printing becomes 80% or less of the total number of times, the identification section 102 determines that the tendency of use is "copying and printing".

A reason why the identification section 102 does not identify the tendency of use until the total number of times for triggering reaches the threshold (e.g., 1,000) is that it is difficult to determine the tendency of use while the total number of times is small. If the destination switching section 103 identifies the tendency of use each time the image forming apparatus 10 is used and the user performs copying, printing, and copying in this order, for example, a percentage of copying changes from 100% to 50% and then to 66%. The tendency of use thus frequently changes, and the log destination is also changed. In the present exemplary embodiment, therefore, the tendency of use is identified each time the total number of times for triggering reaches the threshold.

A reason why the identification section 102 determines that the tendency of use is "copying and printing" if the number of times of copying or printing becomes 80% or less of the total number of times is that if the threshold were 90%, the tendency of use could undesirably be frequently change, and accordingly the log destination would also frequently change.

The destination switching section 103 switches the log destination to a predetermined destination in accordance with an identified tendency of use.

More specifically, as indicated in the following table, the log destination table stores a log destination for each tendency of use. A log destination is a combination of an IP address and a port number of a destination server.

The destination switching section 103 notifies the log transmission section 104 of the identified tendency of use and the log destination determined from the log destination table in order to switch the log destination.

TABLE 3

| Tendency of use | Log destination |
| --- | --- |
| Copying | 111.222.12.34:50010 |
| Printing | 111.222.12.34:50020 |
| Copying and printing | 111.222.12.34:50030 |

This table indicates an example where a destination for image forming apparatuses 10 for "copying", a destination for image forming apparatuses 10 for "printing", and a destination for image forming apparatuses 10 for "copying and printing" are prepared as log destinations for risk analyses and risk detection. In this example, the three destinations have the same IP address and different port numbers.

The log transmission section 104 transmits, using the communication unit 11, a log saved in the log saving area of the nonvolatile memory 44 to the log destination determined by the destination switching section 103.

Next, details of log processing performed by the image forming apparatus 10 will be described in detail.

The program for forming an image, which specifies the log processing, is stored, for example, in the ROM 42 of the image forming apparatus 10 in advance. The CPU 41 of the image forming apparatus 10 reads the program for forming an image stored in the ROM 42 and performs the log processing.

First, the log recording section 101 of the image forming apparatus 10 sequentially records, in the log saving area of the nonvolatile memory 44, events caused in the image forming apparatus 10 as a log.

Figure 5:
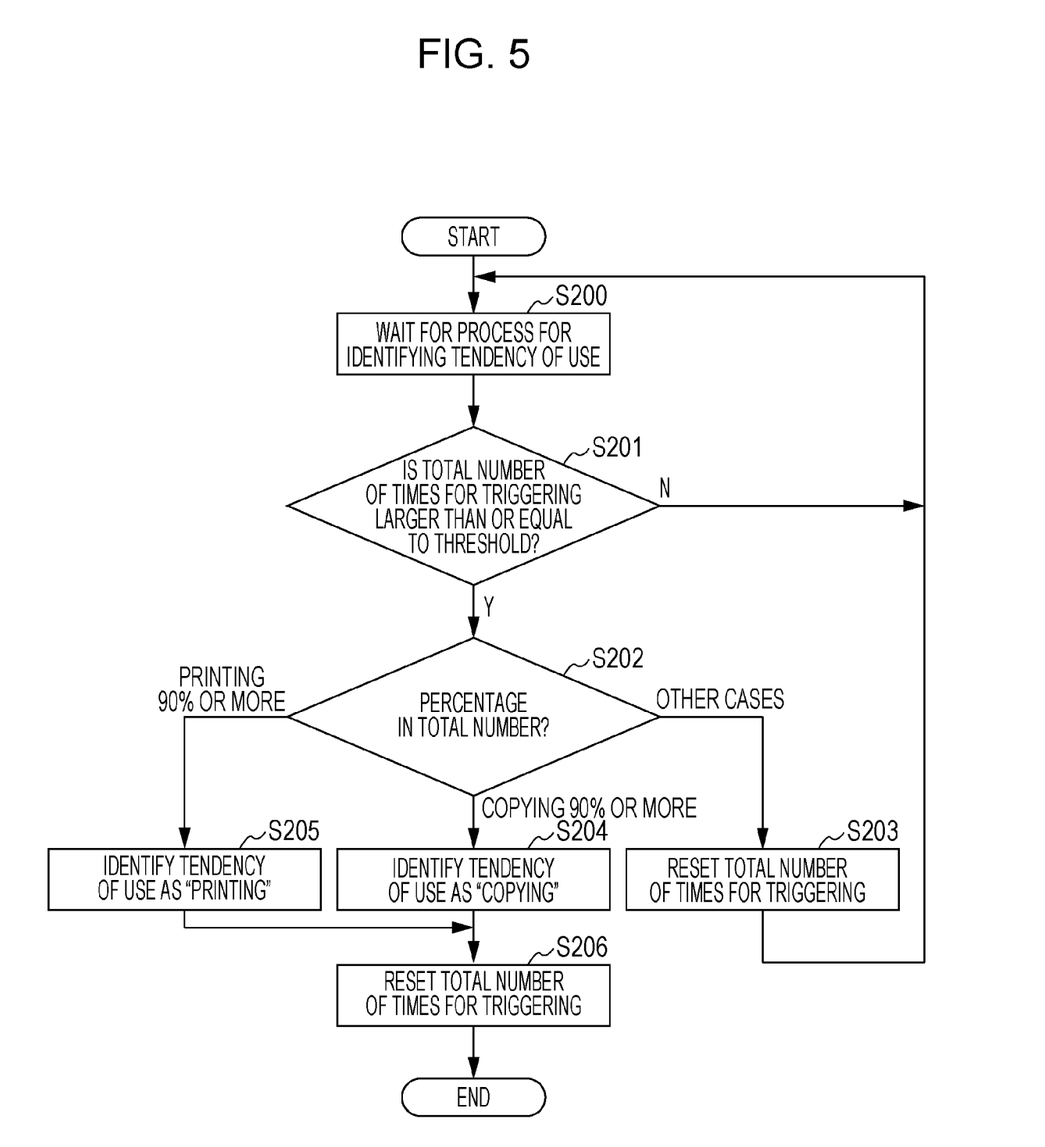
FIG. 5 is a flowchart illustrating an example of a process for identifying a tendency of use performed by the image forming apparatus according to the second exemplary embodiment.

Immediately after the image forming apparatus 10 is installed, or if the tendency of use has been previously identified as "copying and printing", the identification section 102 performs a process for identifying the tendency of use illustrated in FIG. 5. Here, the total number of times for triggering is reset to 0.

First, in step S200, the CPU 41 waits for a trigger for the process for identifying the tendency of use. When the image forming apparatus 10 performs printing, for example, the number of times of copying or the number of times of printing and the total number of times for triggering increase, and the CPU 41 causes the process to proceed to step S201.

In step S201, the CPU 41 determines whether the total number of times for triggering is larger than or equal to the threshold (e.g., 1,000). When the total number of times for triggering reaches 1,000, for example, the CPU 41 causes the process to proceed to step S202. When the total number of times for triggering is smaller than 1,000, on the other hand, the CPU 41 causes the process to return to step S200.

When the number of times of copying is 792 and the number of times of printing is 1, that is, when the total number of times for triggering is 793, for example, the tendency of use is not identified since the total number of times for triggering is smaller than 1,000. When the number of times of copying is 983 and the number of times of printing is 17, that is, when the total number of times for triggering has reached 1,000, on the other hand, the tendency of use is identified.

In step S202, the CPU 41 determines a percentage of the number of times of printing or copying in the total number of times on the basis of the use history. If the percentage of the number of times of printing in the total number of times is 90% or more, the CPU 41 causes the process to proceed to step S205. If the number of times of copying in the total number of times is 90% or more, the CPU 41 causes the process to proceed to step S204. In other cases, the CPU 41 causes the process to proceed to step S203.

In step S203, the CPU 41 resets the total number of times for triggering to 0 and causes the process to return to step S200. In this case, the tendency of use remains identified as "copying and printing".

In step S204, the CPU 41 identifies the tendency of use as "copying" and notifies the destination switching section 103 that the tendency of use is "copying". If the number of times of copying is 983 and the number of times of printing is 17, for example, the percentage of the number of times of copying is 98.3% (=983/1,000×100). The tendency of use, therefore, is identified as "copying".

In step S205, the CPU 41 identifies the tendency of use as "printing" and notifies the destination switching section 103 that the tendency of use is "printing".

In step S206, the CPU 41 resets the total number of times for triggering to 0 and ends the process for identifying the tendency of use.

Figure 6:
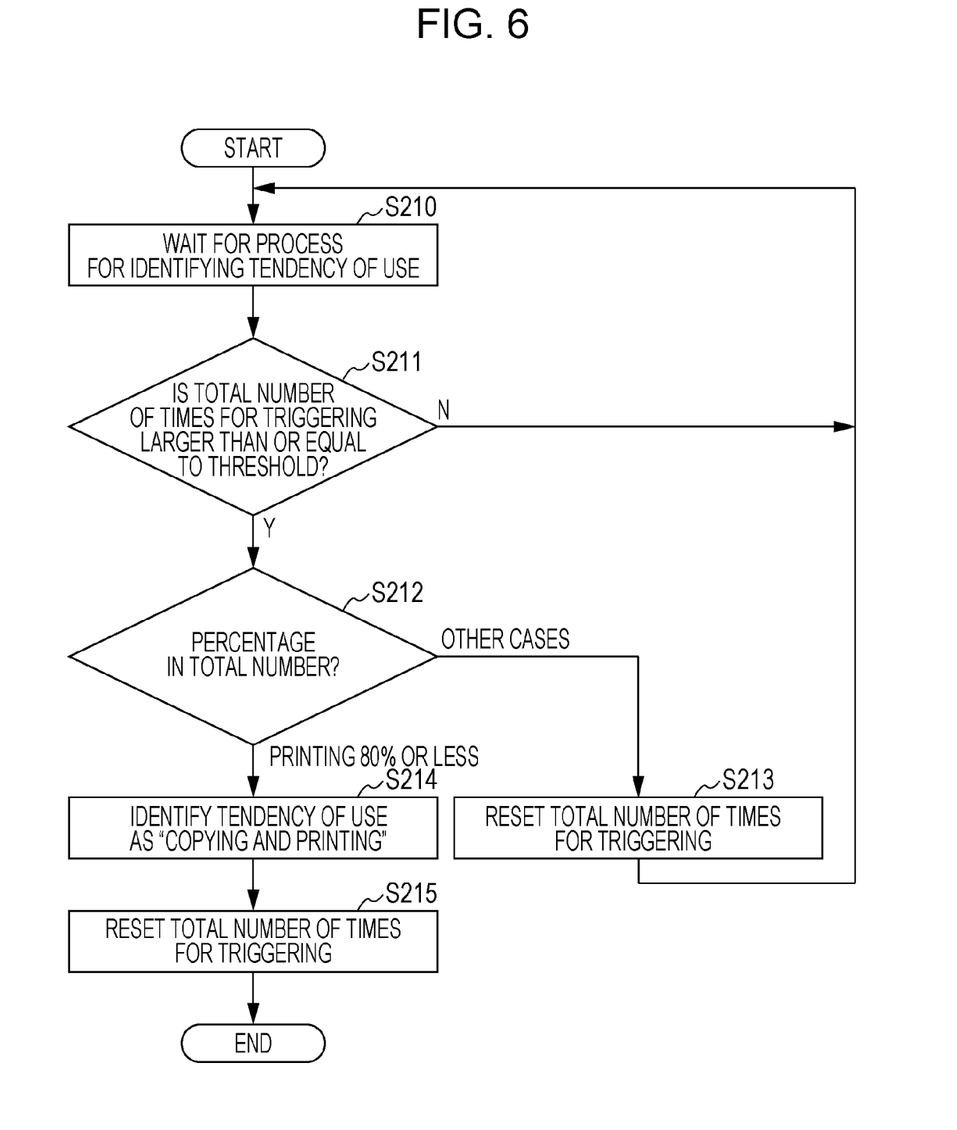
FIG. 6 is a flowchart illustrating another example of the process for identifying a tendency of use performed by the image forming apparatus according to the second exemplary embodiment.

If the tendency of use has been previously identified as "printing", the identification section 102 performs a process for identifying the tendency of use illustrated in FIG. 6. Here, the total number of times for triggering is reset to 0.

First, in step S210, the CPU 41 waits for a trigger for the process for identifying the tendency of use as in step S200.

In step S211, the CPU 41 determines whether the total number of times for triggering is larger than or equal to the threshold (e.g., 1,000). When the total number of times for triggering reaches 1,000, for example, the CPU 41 causes the process to proceed to step S212. When the total number of times for triggering is smaller than 1,000, on the other hand, the CPU 41 causes the process to return to step S210.

In step S212, the CPU 41 determines a percentage of the number of times of printing in the total number of times on the basis of the use history. If the percentage of the number of times of printing in the total number of times is 80% or less, the CPU 41 causes the process to proceed to step S214. If the percentage of the number of times of printing in the total number of times is larger than 80%, the CPU 41 causes the process to proceed to step S213.

In step S213, the CPU 41 resets the total number of times for triggering to 0 and causes the process to return to step S210. At this time, the tendency of use remains identified as "printing".

In step S214, the CPU 41 identifies the tendency of use as "copying and printing" and notifies the destination switching section 103 that the tendency of use is "copying and printing".

If the number of times of copying is 1,458 and the number of times of printing is 365, for example, the percentage of the number of times of copying is 79.98% (=1,458/(1,458+ 365)×100). The tendency of use, therefore, is identified as "copying and printing".

In step S215, the CPU 41 resets the total number of times for triggering to 0 and ends the process for identifying the tendency of use.

Figure 7:
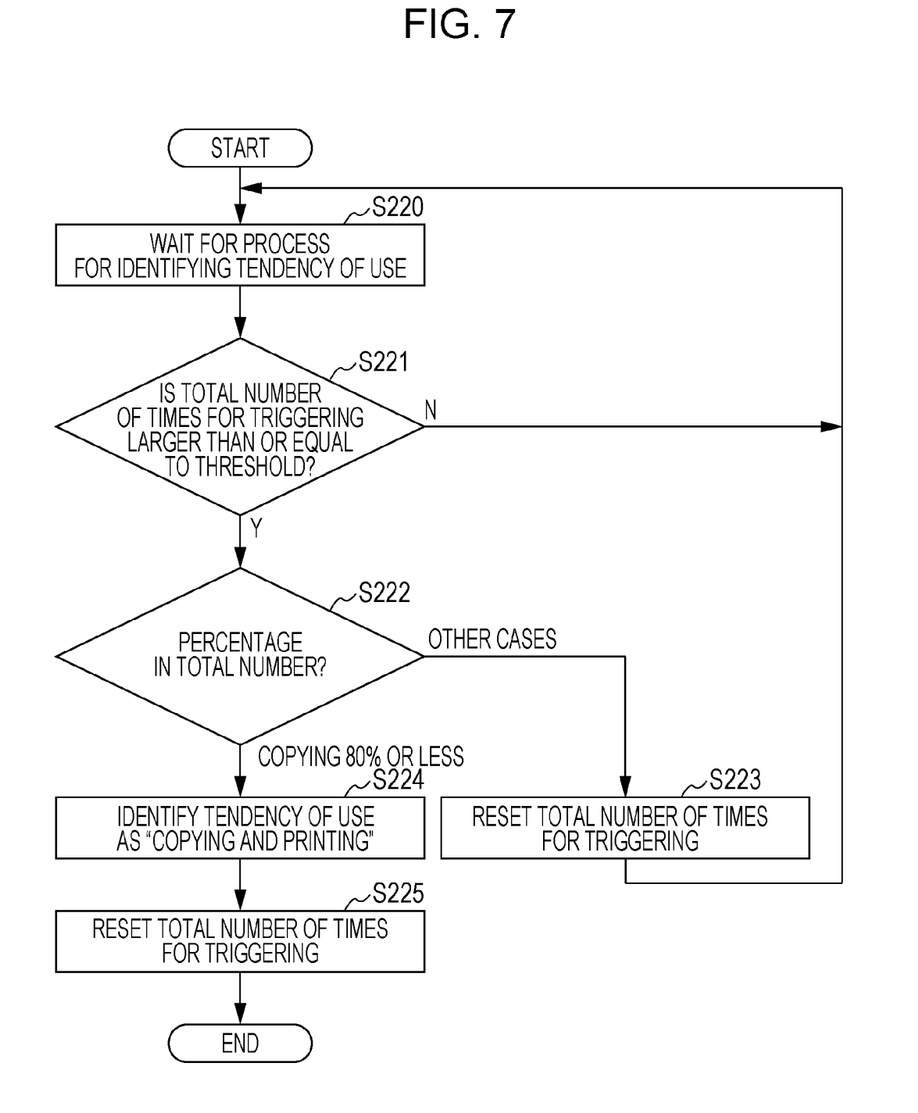
FIG. 7 is a flowchart illustrating another example of the process for identifying a tendency of use performed by the image forming apparatus according to the second exemplary embodiment.

If the tendency of use has been previously identified as "copying", the identification section 102 performs a process for identifying the tendency of use illustrated in FIG. 7. Here, the total number of times for triggering is reset to 0.

First, in step S220, the CPU 41 waits for a trigger for the process for identifying the tendency of use as in step S200.

In step S221, the CPU 41 determines whether the total number of times for triggering is larger than or equal to the threshold (e.g., 1,000). When the total number of times for triggering reaches 1,000, for example, the CPU 41 causes the process to proceed to step S222. When the total number of times for triggering is smaller than 1,000, on the other hand, the CPU 41 causes the process to return to step S220.

In step S222, the CPU 41 determines a percentage of the number of times of copying in the total number of times on the basis of the use history. If the percentage of the number of times of copying in the total number of times is 80% or less, the CPU 41 causes the process to proceed to step S224. If the percentage of the number of times of copying in the total number of times is 80% or more, the CPU 41 causes the process to proceed to step S223.

In step S223, the CPU 41 resets the total number of times for triggering to 0 and causes the process to return to step S220. At this time, the tendency of use remains identified as "copying".

In step S224, the CPU 41 identifies the tendency of use as "copying and printing" and notifies the destination switching section 103 that the tendency of use is "copying and printing".

In step S225, the CPU 41 resets the total number of times for triggering to 0 and ends the process for identifying the tendency of use.

If the identified tendency of use is "copying", for example, the destination switching section 103 switches the log destination to "111.222.12.34:50010" for "copying". The log transmission section 104 then transmits, using the communication unit 11, a log saved in the log saving area of the nonvolatile memory 44 to the destination of the server 20 for processing a log for "copying". Unless the tendency of use changes, the log destination does not change, and the log transmission section 104 transmits logs to the same destination.

If the identified tendency of use is "printing", the destination switching section 103 switches the log destination to "111.222.12.34:50020" for "printing". The log transmission section 104 then transmits, using the communication unit 11, a log saved in the log saving area of the nonvolatile memory 44 to the destination for processing a log for "printing".

If the identified tendency of use is "copying and printing", the destination switching section 103 switches the log destination to "111.222.12.34:50030" for "copying and printing". The log transmission section 104 then transmits, using the communication unit 11, a log saved in the log saving area of the nonvolatile memory 44 to the destination for processing a log for "copying and printing".

The log processing has been described.

The server 20 then performs a risk analysis and risk detection on a log transmitted to the destination for processing a log for "copying", a log transmitted to the destination for processing a log for "printing", and a log transmitted to the destination for processing a log for "copying and printing".

More specifically, the server 20 performs a risk analysis and risk detection on the log transmitted to the destination for processing a log for "copying". If the server 20 detects a sudden increase in the number of times of printing in the log transmitted to the destination for processing a log for "copying", for example, the server 20 determines that a risk has been detected. If the number of times of printing suddenly increases after copying has been mostly performed, therefore, a risk is detected as a sign of leakage of some documents.

Even if the server 20 detects a sudden increase in the number of times of printing in the log transmitted to the destination for processing a log for "printing", the server 20 does not determine that a risk has been detected.

Different types of risk analysis and risk detection are thus performed by separating log destinations for "copying" and "printing".

It is assumed, for example, that one thousand image forming apparatuses 10 are operated and nine hundred of the image forming apparatus 10 and one hundred of the image forming apparatuses 10 are used for copying and printing, respectively. If the one hundred image forming apparatuses 10 used for printing are used more frequently under this condition, it seems that the number of times of printing has suddenly increased, and a risk might be undesirably detected. Since the server 20 performs a risk analysis and risk detection on a log transmitted to the destination for processing a log for "printing" in the present exemplary embodiment, it is not determined under the above condition that a risk has been detected. As a result, incorrect detection of risks is reduced.

Different types of risk analysis and risk detection are thus performed by separating log destinations for "copying", "printing", and "copying and printing".

As described above, according to the second exemplary embodiment, abnormalities in logs are detected more accurately than when logs are transmitted without distinguishing tendencies of use by users of image forming apparatuses from one another. In addition, even if how image forming apparatuses are used changes, accuracy of risk analyses and risk detection does not decrease.

Although some aspects of the image forming system 1 have been described using exemplary embodiments, disclosed modes of the image forming system 1 are examples, and modes of the image forming system 1 are not limited to the above-described exemplary embodiments. The exemplary embodiments may be modified or improved in various ways without deviating from the scope of the present disclosure, and the technical scope of the present disclosure also includes modes achieved as a result of such modification or improvement.

For example, the identification section 102 may identify use conditions (an installation position, temperature, etc.) from positional information and sensor information and transmit a log to a destination predetermined for the identified use conditions.

Although a case where a destination of a log is switched has been described as an example, a method used is not limited to this. Another method may be used, instead, insofar as a log can be transmitted with a type of use, a tendency of use, or use conditions being distinguishable. For example, a log may be transmitted to the server 20 with additional information indicating an identified type of use, an identified tendency of use, or identified use conditions attached.

In addition, although a case where there is one server 20 and a port that serves as a destination of logs is provided for each of types of use or tendencies of use has been described as an example, the number of servers is not limited to this. Plural servers may be provided, instead, and one of the servers may be used as a destination of logs for each of types of use or tendencies of use.

In addition, a mode in which various processes are achieved by software has been described in the above exemplary embodiments as an example. The same processes as those illustrated in the flowcharts of FIGS. 5 to 7, however, may be performed by hardware, instead. In this case, the processes are performed at higher speed than when the processes are achieved by software.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Although an example where the ROM 42 stores the program for forming an image has been described in the above exemplary embodiments, the program for forming an image need not necessarily be stored in the ROM 42. The program for forming an image in the present disclosure may be stored in a storage medium readable by the computer 40 and provided. For example, the program for forming an image may be stored in an optical disc such as a compact disc read-only memory (CD-ROM) or a digital versatile disc read-only memory (DVD-ROM), instead. Alternatively, the program for forming an image may be stored in a portable semiconductor memory such as a universal serial bus (USB) memory or a memory card and provided.

The ROM 42, the ROM 62, the nonvolatile memory 44, the nonvolatile memory 64, the CD-ROM, the DVD-ROM, the USB memory, and the memory card are examples of a non-transitory medium.

Furthermore, the image forming apparatus 10 may download the program for forming an image from an external apparatus (not illustrated) connected to a wireless LAN and store the downloaded program in a non-transitory medium. In this case, the CPU 41 of the image forming apparatus 10 reads the program downloaded from the external apparatus (not illustrated) and executes the log processing.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
determine that a number of times of use of the image forming apparatus by a user has reached a certain value which is greater than 1;
determine among different predetermined tendency of uses, a tendency of use of the image forming apparatus by the user in response to the number of times of use of the image forming apparatus having reached the certain value; and
transmit a log corresponding to the tendency of use regarding use of the image forming apparatus by the user, wherein the tendency of use is determined based on a proportion of uses of the tendency of use by the user related to the number of times of use of the image forming apparatus by the user greater than a predetermined percentage.

2. The image forming apparatus according to claim 1, wherein the processor is configured to transmit the log to a predetermined destination in accordance with the tendency of use.

3. The image forming apparatus according to claim 2, wherein the processor is configured to obtain the type of use from setting information set by the user for the image forming apparatus.

4. The image forming apparatus according to claim 2, wherein the processor is configured to obtain the tendency of use from a use history of the image forming apparatus by the user.

5. The image forming apparatus according to claim 4, wherein the processor is configured to obtain the tendency of use from the use history each time a number of times of use of the image forming apparatus reaches the certain value.

6. The image forming apparatus according to claim 1, wherein the processor is configured to transmit the log with additional information indicating the obtained tendency of use.

7. The image forming apparatus according to claim 6, wherein the processor is configured to obtain the type of use from setting information set by the user for the image forming apparatus.

8. The image forming apparatus according to claim 6, wherein the processor is configured to obtain the tendency of use from a use history of the image forming apparatus by the user.

9. The image forming apparatus according to claim 8, wherein the processor is configured to obtain the tendency of use from the use history each time a number of times of use of the image forming apparatus reaches the certain value.

10. The image forming apparatus according to claim 1, wherein the processor is configured to obtain the type of use from setting information set by the user for the image forming apparatus.

11. The image forming apparatus according to claim 1, wherein the processor is configured to obtain the tendency of use from a use history of the image forming apparatus by the user.

12. The image forming apparatus according to claim 11, wherein the processor is configured to obtain the tendency of use from the use history each time a number of times of use of the image forming apparatus reaches the certain value.

13. A non-transitory computer readable medium storing a program causing a computer to execute a process for image formation, the process comprising:
  determining that a number of times of use of the image forming apparatus by a user has reached a certain value which is greater than 1;
  determining, among different predetermined tendency of uses, a tendency of use of the image forming apparatus by the user in response to the number of times of use of the image forming apparatus having reached the certain value; and
  transmitting a log corresponding to the tendency of use regarding use of the image forming apparatus by the user, wherein the tendency of use is determined based on a proportion of uses of the tendency of use by the user related to the number of times of use of the image forming apparatus by the user greater than a predetermined percentage.

14. An image forming method comprising:
  determining that a number of times of use of the image forming apparatus by a user has reached a certain value which is greater than 1;
  determining, among different predetermined tendency of uses, a tendency of use of the image forming apparatus by the user in response to the number of times of use of the image forming apparatus having reached the certain value; and
  transmitting a log corresponding to the tendency of use regarding use of the image forming apparatus by the user, wherein the tendency of use is determined based on a proportion of uses of the tendency of use by the user related to the number of times of use of the image forming apparatus by the user greater than a predetermined percentage.

* * * * *